Figures 1, 2:
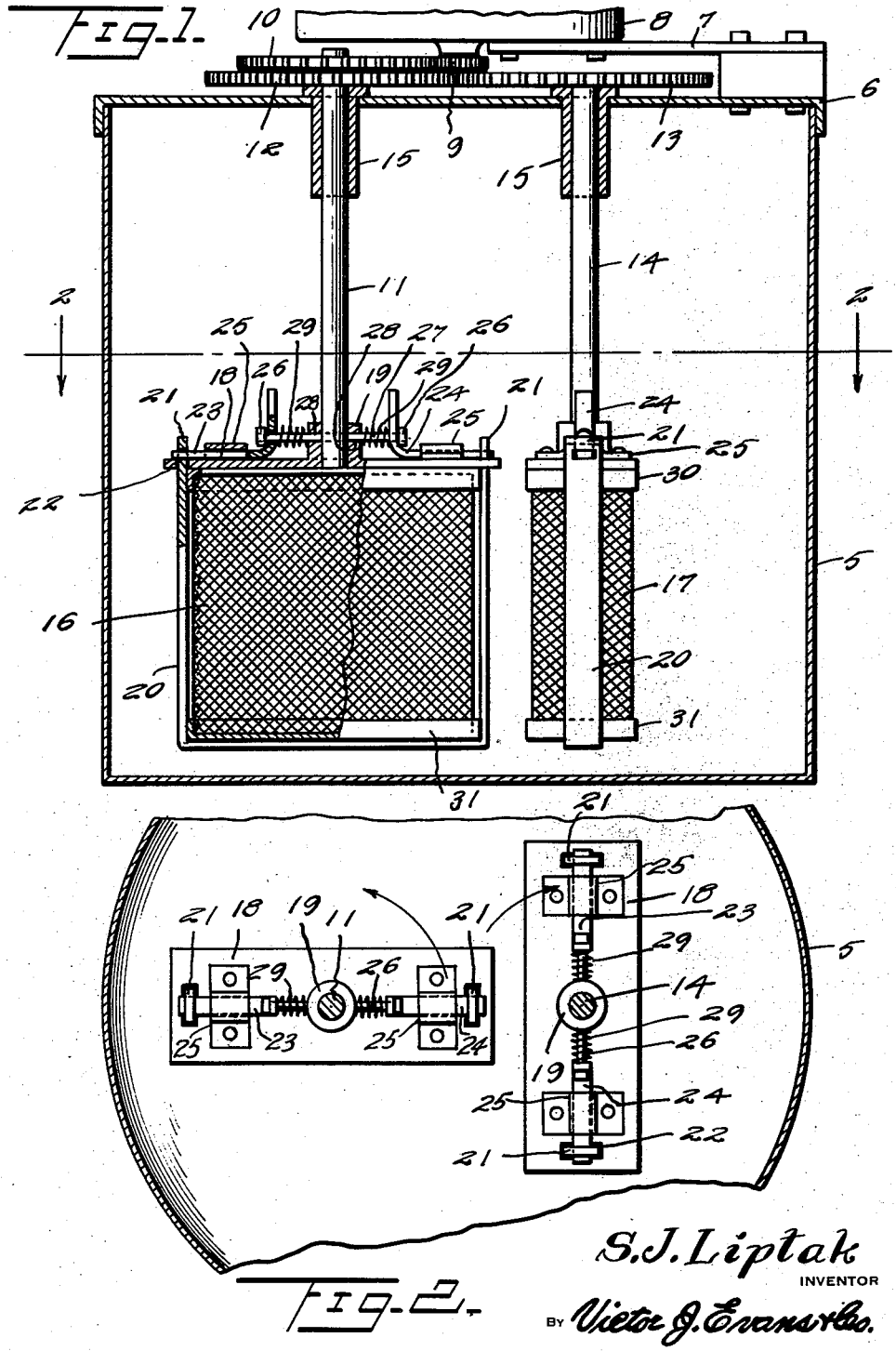

March 31, 1942.  S. J. LIPTAK  2,277,919
WATCH CLEANING MACHINE
Filed July 18, 1939

S. J. Liptak
INVENTOR

BY Victor J. Evans & Co.
ATTORNEYS

Patented Mar. 31, 1942

2,277,919

UNITED STATES PATENT OFFICE 2,277,919

WATCH CLEANING MACHINE

Stephen J. Liptak, Aliquippa, Pa.

Application July 18, 1939, Serial No. 285,177

2 Claims. (Cl. 141—1)

The present invention relates to watch cleaning machines and more particularly to machines for cleaning watch or clock movements by rigidly rotating a basket containing the parts to be cleaned within a jar containing a cleaning fluid or solution.

At the present time in the cleaning of watch or clock movements, the basket containing the parts to be cleaned is rigidly rotated within a jar containing a cleaning liquid or solution, the rapid rotation of the basket causing the cleaning fluid to be swirled up against the sides of the jar or container with the result that the parts are not at all times acted upon by the cleaning solution. As soon as rotation of the basket is effected the liquid follows in the same direction, there being a centrifugal force which carries the liquid to a high level on the sides of the jar thereby leaving the center substantially dry. This materially reduces the cleaning power of the machine and at the same time renders a possibility of the parts going dry.

An important object of the invention, therefore, resides in the provision of a watch cleaning unit that will allow for the basket containing the parts to be cleaned to be rigidly rotated while maintaining a substantially constant level of the solution within the container at all times.

A further object of the invention resides in the provision of a watch cleaning unit embodying the use of a pair of baskets for containing the parts to be cleaned, the baskets being mounted on individual shafts adapted to rotate in opposite directions whereby an agitating effect of the solution is provided to minimize the possibility of the solution rising along the sides of the container as the baskets are rotated.

A still further object of the invention resides in the provision of novel means for removably associating the baskets with the rotating shafts whereby placement and removal of the parts may be facilitated.

The invention will be fully and comprehensively understood from a consideration of the following detailed description when read in connection with the accompanying drawing which forms a part of the application.

In the drawing:

Figure 1 is a sectional view with parts in elevation illustrating a watch cleaning machine embodying the features of the present invention, and Figure 2 is a horizontal sectional view taken substantially on line 2—2 of Figure 1.

Referring to the drawing for a more detailed description thereof, in which like reference characters refer to like parts, there is disclosed a jar or container 5 for containing a cleaning or rinsing solution. A cover 6 is removably supported upon the jar, said cover having secured thereto a bracket 7 for supporting an electric motor 8. The motor 8 drives from its shaft a gear 9 which meshes with a gear 10 secured to the upper end of the basket carrying shaft 11 for rotating said shaft and its basket within the jar. The shaft 11 also carries a gear 12 parallel with and spaced from the gear 10, the former meshing with a gear 13 for rotating the shaft 14 which likewise supports a basket within the jar 5. The shafts 11 and 14 extend through bushings 15 carried by the cover 6 with the gears 12 and 13 being secured to their respective shafts by any desired means.

The baskets 16 and 17 are supported on the lower ends of the shafts 11 and 14, respectively, and are arranged at substantially right angles to each other as more clearly shown in Figure 2 of the drawing. The baskets are supported by an identical construction comprising a plate 18 having a collar 19 for receiving the end of the shaft, said shaft being retained therein by a set screw or other fastening means. The basket 16 rests within a U-shaped frame 20, the ends 21 of which project through slotted openings 22 formed in each end of the plate 18. The frame 20 is held in position against the plate by means of the pins 23 and 24, which pins are slidably mounted in guideways 25 formed on the upper face of the plate and adapted to engage an opening formed in the ends 21 of the frame 20. The pins 23 and 24 are bent at right angles to the plate 18 and are held by means of a rod 27 which is mounted in the slots 28 formed in the collar 19. The rod 27 extends through the collar 19 and shaft 11 and each end is formed with a head 26 against which the upturned ends of the pins 23 and 24 bear. A coil spring 29 surrounds the rod 27 on opposite sides of the collar 19 against which the pins 23 and 24 will bear for retaining said pins in normal position. Squeezing lightly on the upturned ends of the pins 23 and 24 will retract them from the slots formed in the ends 21 permitting removal of the basket 16 for placement or removal of parts to be cleaned in the basket.

The baskets 16 and 17 comprise a top ring 30 and lower ring 31 to which is secured the body of the basket, which is formed of wire screening. The U-shaped frame 20 is welded or otherwise secured to the end portions of the rings 30 and 31, respectively, whereby a relatively rigid structure is formed.

If desired trays or auxiliary baskets may be provided to be supported within the baskets 16 and 17 for holding the small watch parts such as the balance and hair springs.

When using the device, the cover 6 is first removed carrying with it the baskets 16 and 17. By pressing together the upwardly turned ends of the pins 23 and 24 the baskets will be freed from the plate 18 and the parts to be cleaned are then deposited within the baskets. After positioning the baskets on their plates, the cover 6 will be replaced and the motor started causing the shafts 11 and 14 and the baskets 16 and 17 to revolve in opposite directions reversely agitating the solution, defining an action similar to an egg beater. The rotary motion of the baskets will also allow for a full and free entrance of the cleaning solution whereby the parts contained therein are thoroughly cleaned with a minimum displacement of the solution along the sides of the container.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. An attachment for a watch cleaning machine having a rotary shaft comprising a plate adapted to be fixed transversely to the said shaft, the said plate having an opening adjacent each end, a frame member adapted to encompass a cleaning basket having the opposite end portions slidably extended through the openings in the plate and having openings in the said end portions above the plate, a pair of complementary fastening elements slidably mounted on the plate, and spring means acting against the said elements yieldingly forcing the same to extended position wherein the ends of the elements extend through the openings in the ends of the frame to fasten the frame to the plate, the said fastening elements being manually compressible to retracted frame releasing positions.

2. In an attachment for a watch cleaning machine having a rotary shaft, and elongated plate having a slot in each end portion, a collar mounted on the center portion of the plate adapted for fixed connection with the end of the said shaft for mounting the plate transversely of the end of the shaft, guideways formed on the said plate, an approximately U-shaped frame member adapted to encompass a watch cleaning basket having its opposed ends extended through the slots in the ends of the plate, the projecting end portions of the said frame having openings therein, a pair of complementary angular shaped fastening elements slidably fitted in the guideways of the plate and slidable longitudinally thereon, and a pair of springs mounted on the plate and acting against the basket elements to yieldingly force the elements to outwardly directed positions so that their outer ends extend through the openings in the ends of the frame to lock the frame on the plate, the said fastening elements being manually compressible against the action of the said springs to retract the elements for releasing the frame.

STEPHEN J. LIPTAK.